US007245231B2

(12) United States Patent
Kiefer et al.

(10) Patent No.: US 7,245,231 B2
(45) Date of Patent: Jul. 17, 2007

(54) COLLISION AVOIDANCE SYSTEM

(75) Inventors: Raymond J. Kiefer, Huntington Woods, MI (US); Donald K. Grimm, Utica, MI (US); Bakhtiar Brian Litkouhi, Washington, MI (US); Varsha Sadekar, Sterling Heights, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 148 days.

(21) Appl. No.: 11/035,416

(22) Filed: Jan. 13, 2005

(65) Prior Publication Data

US 2005/0258977 A1 Nov. 24, 2005

Related U.S. Application Data

(60) Provisional application No. 60/571,987, filed on May 18, 2004.

(51) Int. Cl.

| | |
|---|---|
| ***B60Q 1/00*** | (2006.01) |
| ***H04B 3/36*** | (2006.01) |
| ***G06F 17/10*** | (2006.01) |
| ***G06G 7/78*** | (2006.01) |
| ***G08G 1/16*** | (2006.01) |

(52) U.S. Cl. .................. 340/903; 340/435; 340/407.1; 701/301

(58) Field of Classification Search ................ 340/903, 340/932.2, 465, 667, 7.6, 407.1, 435–462; 700/300–302; 297/217.3, 463.2; 116/35 R, 116/36, 205; 701/1

See application file for complete search history.

(56) References Cited

U.S. PATENT DOCUMENTS

| | | | | |
|---|---|---|---|---|
| 4,484,191 | A * | 11/1984 | Vavra | 340/965 |
| 6,812,833 | B2 * | 11/2004 | Rothkop et al. | 340/475 |
| 7,167,781 | B2 * | 1/2007 | Lee | 701/3 |
| 2002/0145512 | A1 * | 10/2002 | Sleichter et al. | 340/407.1 |
| 2003/0025601 | A1 * | 2/2003 | Gruteser et al. | 340/540 |
| 2003/0229447 | A1 | 12/2003 | Wheatley et al. | 701/301 |
| 2004/0049323 | A1 | 3/2004 | Tijerina et al. | 701/1 |
| 2005/0075770 | A1 * | 4/2005 | Taylor et al. | 701/36 |
| 2006/0250224 | A1 * | 11/2006 | Steffel et al. | 340/435 |

* cited by examiner

*Primary Examiner*—Benjamin C. Lee
*Assistant Examiner*—Jennifer Mehmood
(74) *Attorney, Agent, or Firm*—Kathryn A. Marra

(57) ABSTRACT

A method of collision avoidance. The method includes receiving a signal indicative of a potential collision of a vehicle. The method also includes generating a haptic collision alert in response to the signal.

21 Claims, 2 Drawing Sheets

COLLISION AVOIDANCE SYSTEM

CROSS REFERENCE TO RELATED APPLICATIONS

This application claims the benefit of U.S. Provisional Application Ser. No. 60/571,987 filed May 18, 2004, entitled COLLISION AVOIDANCE SYSTEM, which is hereby incorporated by reference.

BACKGROUND

This disclosure relates to a collision avoidance system, and more particularly, to a collision avoidance system that utilizes haptic alerts.

Collision avoidance systems are emerging in the marketplace to warn drivers of potential collision threats in the forward, side (left and right), and rear directions. Current collision avoidance systems utilize visual and/or auditory alerts to warn a vehicle driver of a potential collision.

SUMMARY

Exemplary embodiments of the present invention include a method of collision avoidance. The method includes receiving a signal indicative of a potential collision of a vehicle. The method also includes generating a haptic collision alert in response to the signal.

Additional exemplary embodiments include a method of collision avoidance. The method includes receiving a signal indicative of a potential collision of a vehicle in a given directional location. A haptic collision alert corresponding to the given directional location is generated in response to the signal. A vehicle driver receives an indication of the possible collision direction by the location of the haptic collision alert.

Additional exemplary embodiments include a method of collision avoidance. The method includes receiving a signal indicative of a potential collision of a vehicle in a given directional location. A haptic collision alert corresponding to the given directional location is generated in response to the signal. The haptic collision alert includes vibrating a seat pan of a vehicle driver seat in the vehicle. The vehicle driver receives an indication of the possible collision direction by the location of the vibration in the seat pan.

Further exemplary embodiments include a system of collision avoidance. The system includes a controller in communication with one or more haptic warning systems. The haptic warning systems are located on a vehicle and the controller includes instructions to implement a method. The method includes receiving a signal indicative of a potential collision of a vehicle. A haptic collision alert is generated in response to the signal and the haptic collision alert is transmitted to at least one of the haptic warning systems.

Still further exemplary embodiment include a storage medium encoded with machine readable computer program code for collision avoidance. The storage medium includes instructions for causing a computer to implement a method. The method includes receiving a signal indicative of a potential collision of a vehicle. A haptic collision alert is generated in response to the signal.

The above described and other features are exemplified by the following figures and detailed description.

BRIEF DESCRIPTION OF THE DRAWINGS

Referring now to the figures, which are exemplary embodiments and wherein like elements are numbered alike.

DESCRIPTION OF THE PREFERRED EMBODIMENT

Exemplary embodiments of the present invention provide integrated haptic collision alerts that supply timely information to a driver of a vehicle about the presence, urgency and direction of potential collision threats. In an exemplary embodiment of the present invention, vibration alerts in the seat pan of the driver's seat cushion are utilized to inform the driver of the presence, urgency, and direction of potential collision threats. Illustrative approaches are described below in which the seat vibration activity is mapped to the direction and urgency of a collision threat (and by implication, these approaches also indicate the presence of the collision threat).

It will be appreciated that the exemplary approaches described herein can easily be extended to accommodate any current and future collision avoidance system. In addition, it should be noted that the seat vibration alert approach may be combined with other warning sensory modalities (e.g., auditory, visual, haptic/tactile).

Figure 1:
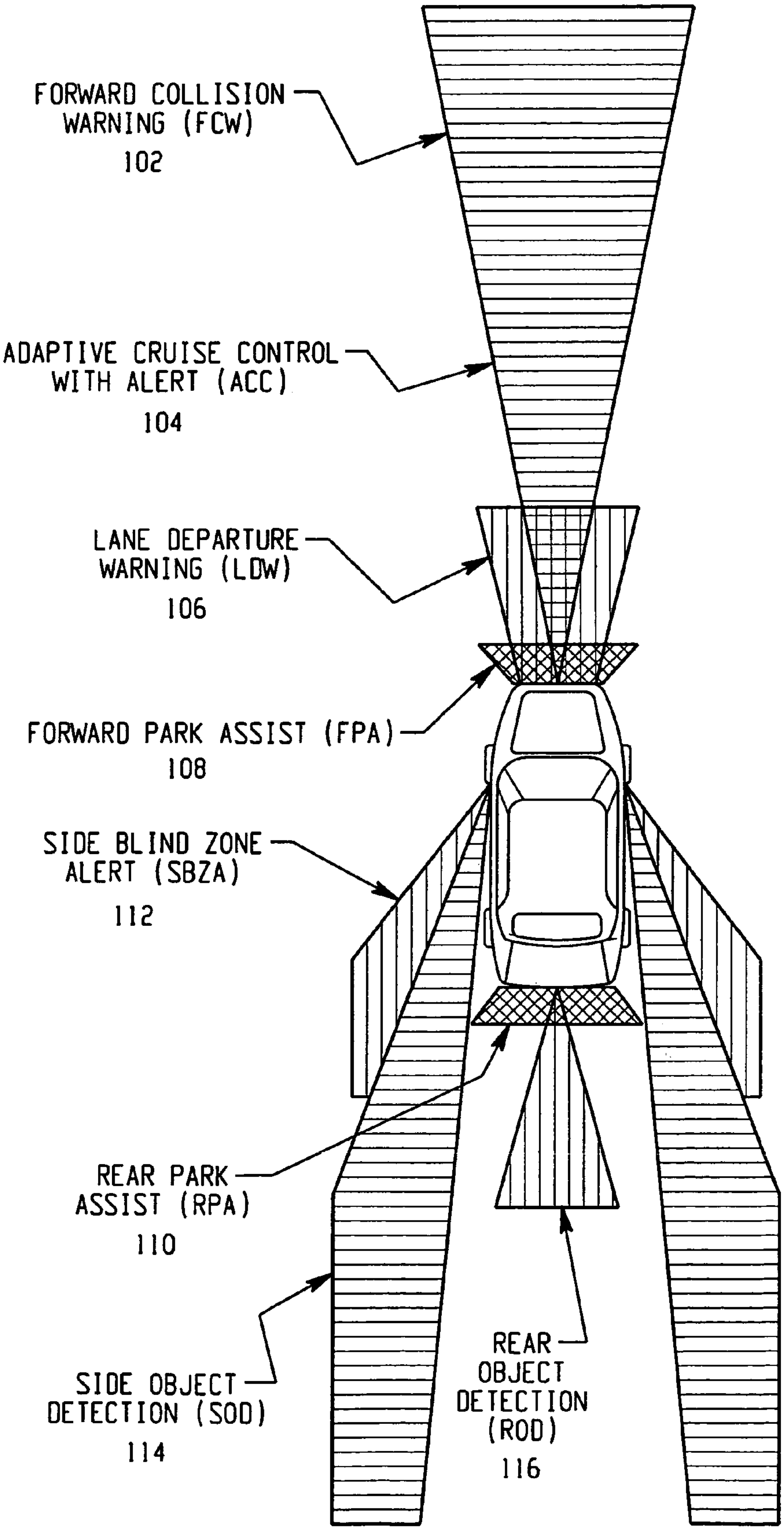
FIG. 1 is a schematic of the zone (or field of view) coverage for exemplary short range and long range collision avoidance systems which monitor threats in the forward, side and rear directions.

Referring herein to FIG. 1, a schematic example of the zone (or field-of-view) coverage for collision avoidance systems is provided. Examples of such systems include Forward Collision Warning (FCW) 102, Adaptive Cruise Control (ACC) 104, Forward Park Assist (FPA) 108, Lane Departure Warning (LDW) 106, Side Blind Zone Alert (SBZA) 112 (also referred to as a "blind spot system"), (longer range) Side Object Detection (SOD) 114 (also referred to as a "lane change alert system"), Rear Park Assist (RPA) 110, and (longer range) Rear Object Detection (ROD) 116 (also referred to as a "backing warning system"). Please note that these zones are not drawn to scale, and are intended for illustrative purposes only.

For the driver of a vehicle equipped with multiple collision avoidance systems (such as those shown in FIG. 1) that are monitoring different directions of collision threats, collision alerts should be presented in a manner that allows the driver to quickly and accurately assess the direction and urgency of a collision threat. This will facilitate the ability of the driver to respond to the collision threat in a timely, effective, and appropriate manner to help in avoiding the collision, or in mitigating the impact of the collision. Appropriate driver responses to the collision alert may include braking, accelerating, and/or steering, or simply making no response in the case of a false alarm.

In the present example, there are three sensory modalities that can potentially be utilized to provide collision alerts to drivers in a timely and effective manner: visual, auditory, and haptic. Haptic alerts refer to any warning that is presented through the proprioceptive (or kinesthetic) senses, such as brake pulse deceleration/vehicle jerk, steering wheel vibration/pushback, or accelerator pedal vibration/pushback cues. Seat vibration alerts, a particular example of a haptic alerts, provide a robust method of warning drivers of the presence, direction, and urgency of a potential collision threat. Relative to visual collision alerts, haptic alerts, such as seat vibration alerts, offer the advantage that the driver does not need to be looking in any particular direction (e.g., toward the visual alert) in order to detect and respond appropriately to the collision alert. In this sense, similar to auditory collision alerts, haptic alerts, such as seat vibration alerts, can be viewed as essentially "omni-directional" in nature.

Relative to auditory collision alerts, haptic alerts, such as seat vibration alerts, may be more effective at indicating to the driver the direction of the collision threat. Variations in factors, such as the number and position of speakers, existence of rear speakers, occupant seat/eye/ear positioning, interior ambient noise, cabin architecture and materials, and objects and passengers inside the vehicle, suggest the tremendous complexities involved in presenting collision alert sounds in a manner that would allow the driver to quickly and accurately identify the collision threat direction from auditory collision alerts. In addition, relative to auditory collision alerts, haptic alerts, such as seat vibration alerts, are likely to be perceived as less annoying to drivers (and passengers) during false alarms since they do not interrupt ongoing audio entertainment. Note, that this assumes that collision avoidance systems will temporarily mute or at least reduce audio volume when auditory collision alerts are presented. Furthermore, unlike auditory collision alerts, seat vibration collision alerts would allow the driver to experience the collision alert "privately" (or discretely) without fear of criticism by passengers.

Relative to auditory and visual collision alerts, haptic collision alerts (of which seat vibration cues is one example) may be under-utilized from a driver workload (or attention capacity) perspective, since it can be argued that drivers receive most of their information while driving via the visual and auditory modalities. In addition, relative to auditory and visual collision alerts, the implementation of haptic alerts (e.g., seat vibration alerts) appear to be less sensitive to vehicle-to-vehicle differences. These differences include the number and position of speakers (or speaker layout), existence of rear speakers, occupant positioning (including ear, eye, and head positioning), interior and exterior ambient noise, cabin architecture and materials, objects and passengers inside the vehicle, and the ability of the vehicle architecture to accommodate visual collision alert displays at a various locations. Further, haptic alerts appear to be less sensitive to within-driver and driver-to-driver variability than auditory and visual collision alerts. This variability includes changes in occupant positioning (including ear, eye, and head positioning) within and across driving trips, and differences in drivers' modality sensitivity/impairment. An example of the latter point is that older drivers commonly suffer impairments in both the visual and auditory modalities, whereas their ability to sense seat vibrations (and haptic collision alerts in general) are less likely to be impaired.

Hence, the use of haptic collision alerts, such as seat vibration collision alerts, increases the ability of a driver to properly use and intuitively understand multiple collision avoidance systems within their vehicle (as well as across vehicles), increases the collision avoidance/mitigation benefits afforded by these systems, and decreases the cost of these systems (in light of the robustness and lack of complexity advantages suggested above). The use of haptic alerts also allows automobile manufacturers to "pick and choose" any subset of available collision avoidance systems without compromising (via system interactions) the collision avoidance benefits afforded by these systems. More generally, utilizing haptic collision alerts, such as seat vibration collision alerts, may increase the deployment and effectiveness of collision avoidance systems.

An exemplary embodiment of the present invention utilizes a seat vibration as a haptic collision alert to indicate to the driver of a vehicle the presence, direction, and urgency of a collision threat in a vehicle equipped with multiple collision avoidance (or warning) systems as illustrated in FIG. 1. The driver experiences seat vibration collision alerts, or cues, through the seat cushion (bottom, or seat pan) portion of the driver's seat (e.g., via a matrix of vibrating elements embedded in the seat cushion), that is, where the driver's buttocks and back of their thighs contact the seat. In an alternate exemplary embodiment of the present invention, other parts of the vehicle that a driver has direct contact with (e.g., the back of the seat, seatbelts, steering wheel, accelerator, brakes) are vibrated to warn of a potential collision. These examples are intended to be illustrative only, and should not be interpreted as boundaries for this scope of invention. Also note that the urgency of the collision threat in each of these examples may be manipulated in a straightforward manner (e.g., by changing the rate at which the seat is vibrated, the length of the vibration, or the intensity of the vibration).

Figure 2:
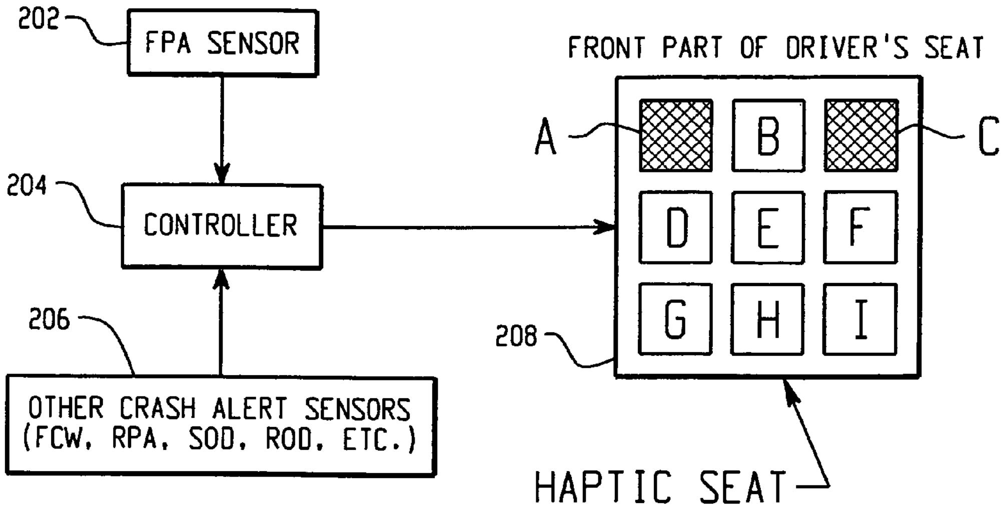
FIG. 2 is a system for providing haptic collision avoidance alerts in accordance with exemplary embodiments of the present invention.

FIG. 2 is a system diagram for providing haptic collision avoidance alerts in accordance with exemplary embodiments of the present invention. In the example depicted in FIG. 2, a forward park assist (FPA) sensor 202 is in communication with a controller 204. The FPA sensor 202 communicates to the controller 204 information about the location of objects ahead relative to the driver's vehicle. The controller 204 continuously evaluates information received from the FPA sensor 202 to determine if an object is closer than a selected threshold and hence, if the object poses a collision threat to the vehicle. If the collision alert algorithm located on the controller 204 determines that the driver should be warned of a collision threat, a haptic seat vibration warning is provided in the appropriate location(s) of a haptic seat 208. Also as shown in FIG. 2, data from other collision alert sensors 206 may also be input to the controller 204. In this manner, the sensor data from multiple collision avoidance systems may be collected by the controller 204 and utilized by the controller 204 to determine what haptic alerts to communicate to the driver of the vehicle. In the example shown in FIG. 2, the haptic alerts are provided to the driver via vibrations in matrix locations "A" and "C" on the driver's seat cushion in response to a collision threat being located in front of the vehicle.

Any haptic method of communicating to the driver, as known in the art, may be implemented by exemplary embodiments of the present invention. For example, locations in the seat may pulse instead of vibrate. The vibrating and pulsing may occur at different speeds and/or intensities to indicate the urgency of the collision alert. Pulsing or vibrating could be accomplished through many devices, such as seat inflation bladders, or other vibration devices. In addition, other portions of the vehicle may be utilized to provide haptic alerts to the driver of the vehicle. Examples include the back of the seat, the accelerator and/or the steering wheel. Occupants of the vehicle may be provided with the haptic alerts (e.g., driving school vehicles equipped to alert instructors of collision threats). Combinations of various haptic methods and vehicle locations utilized to provide alerts may be implemented by exemplary embodiments of the present invention.

In an exemplary embodiment of the present invention, the area of the seat cushion that is vibrated is spatially mapped to the corresponding direction of the collision threat, as indicated below:

| Direction of Collision Threat (Degrees offset from driver using 0° as straight ahead reference point) | General Area of Seat Cushion That is Vibrated |
|---|---|
| Forward-Straight Ahead (0°) | Front (A, C) |
| Forward-Left Side (−45°) | Front-Left (A) |
| Forward-Right Side (+45°) | Front-Right (C) |
| Side-Left of Vehicle (−90°) | Left Side-Center (D) |
| Side-Right of Vehicle (+90°) | Right Side-Center (F) |
| Rearward-Straight Back (180°) | Rear-Center (H) |
| Rearward-Left Side (−135°) | Rear-Left (G) |
| Rearward-Right Side (+135°) | Rear-Right (I) |

Figure 3:
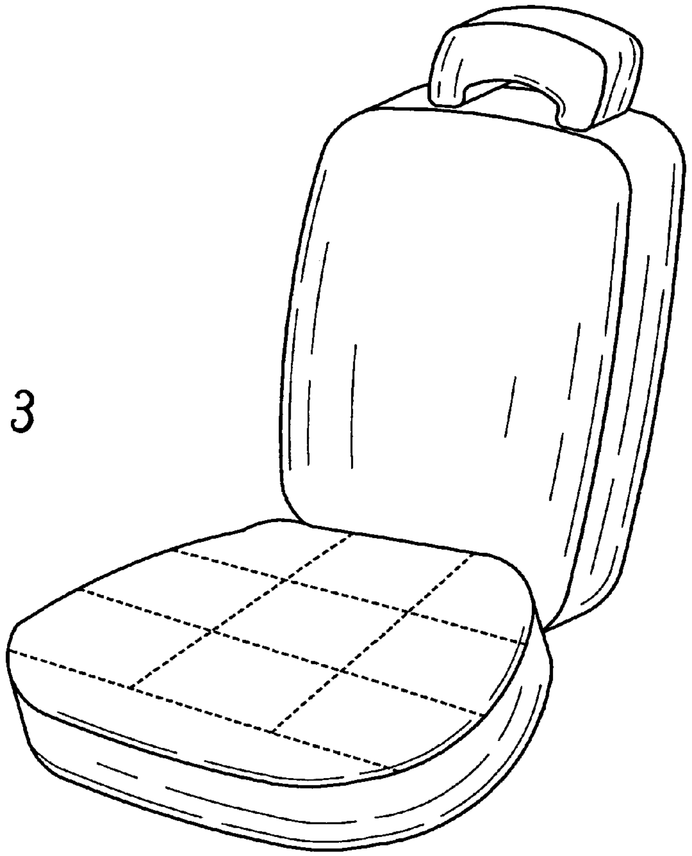
FIG. 3 illustrates example partitions in a seat cushion that may be utilized to provide haptic collision avoidance alerts in an exemplary embodiment of the present invention.

In this example, seat vibration collision alerts corresponding to the four cardinal and four oblique directions in the haptic seat 208 are represented. The letters in parenthesis represent the partition, or matrix, locations as labeled in the haptic seat 208 illustrated in FIG. 2. A picture of a seat pan portion of a seat cushion with the partition locations marked is depicted in FIG. 3.

An alternative exemplary embodiment of the present invention is similar to the previously discussed embodiment, with the exception that the directional seat vibration collision alert (as defined in the above table) is preceded by an initial "master" seat vibration collision alert which will occur in the center portion of the seat. The purpose of this master collision alert is to first notify the driver of the presence of a collision threat, to provide a frame of reference for which the subsequent directional seat vibration collision alert can be perceived, and to create the perception of apparent motion toward the direction of the collision threat. This added frame of reference may allow the driver to more quickly and effectively identify the direction of the collision threat.

As described above, the embodiments of the invention may be embodied in the form of computer-implemented processes and apparatuses for practicing those processes. Embodiments of the invention may also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. An embodiment of the present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another.

The invention claimed is:

1. A method of collision avoidance comprising:

receiving a signal indicative of a potential collision of a vehicle in a given directional location; and generating a haptic collision alert corresponding to the given directional location in response to the signal, wherein the haptic collision alert includes vibrating a seat pan of a vehicle driver seat in the vehicle and the haptic collision alert indicates the urgency of the potential collision by varying both a rate of vibration and an intensity of vibration;

wherein the seat pan is partitioned into a three by three matrix having a front row positioned near the front of the driver seat, a rear row positioned near the rear of the driver seat and a mid row positioned between the front row and the rear row, each row having a left matrix location positioned near the left side of the driver seat, a right matrix location positioned near the right side of the driver seat and a center matrix location positioned between the left matrix location and the right matrix location; and the location of the vibration in the seat pan includes one or more of the matrix locations;

whereby a vehicle driver receives an indication of the possible collision direction by the location of the vibration in the seat pan.

2. The method of claim 1 wherein the signal is responsive to one or more collision avoidance systems each monitoring a directional location around the vehicle.

3. The method of claim 2 wherein the haptic collision alert indicates one or more of the directional locations monitored by the collision avoidance systems.

4. The method of claim 2 wherein the collision avoidance systems include one or more of a forward collision warning system, a lane departure warning system, a forward park assist system and a rear park assist system.

5. The method of claim 2 wherein the collision avoidance systems include one or more of a forward collision warning system, a lane departure warning system, a forward park assist system, a rear park assist system, a backing warning system, a lane change alert system, and a blind spot system.

6. The method of claim 1 wherein the signal is responsive to two or more collision avoidance systems, and the collision avoidance systems monitor two or more directional locations around the vehicle.

7. The method of claim 1 wherein:

the possible collision direction of straight ahead of the vehicle is indicated when the vibration is located in both the right and left matrix locations of the front row;

the possible collision direction of forward right side of the vehicle is indicated when the vibration is located in the right matrix location of the front row;

the possible collision direction of forward left side of the vehicle is indicated when the vibration is located in the left matrix location of the front row;

the possible collision direction of left side of the vehicle is indicated when the vibration is located in the left matrix location of the mid row;

the possible collision direction of right side of the vehicle is indicated when the vibration is located in the right matrix location of the mid row;

the possible collision direction of straight behind the vehicle is indicated when the vibration is located in the center matrix location of the rear row;

the possible collision direction of rear left side of the vehicle is indicated when the vibration is located in the left matrix location of the rear row; and the possible collision direction of rear right side of the vehicle is indicated when the vibration is located in the right matrix location of the rear row.

8. The method of claim 1 wherein:

the possible collision direction of straight ahead of the vehicle is indicated when the vibration is located in:

the right and left matrix locations of the front row;

the right, center, and left matrix locations of the front row; or the center matrix location of the front row;

the possible collision direction of forward left side, left side or rear left side of the vehicle is indicated when the vibration is located in one or more of the left matrix location of the front row, the left matrix location of the mid row and the left matrix location of the rear row;

the possible collision direction of forward right side, right side or rear right side of the vehicle is indicated when the vibration is located in one or more of the right matrix location of the front row, the right matrix location of the mid row and the right matrix location of the rear row; and the possible collision direction of straight behind the vehicle is indicated when the vibration is located in:

the right and left matrix locations of the rear row;

the right, center, and left matrix locations of the rear row; or the center matrix location of the rear row.

9. The method of claim 1 wherein:

the possible collision direction of straight ahead of the vehicle is indicated when the vibration is located in both the right and left matrix locations of the front row;

the possible collision direction of forward right side, right side or rear right side of the vehicle is indicated when the vibration is located in one or more of the right matrix location of the mid row and the right matrix location of the rear row;

the possible collision direction of forward left side, left side or rear left side of the vehicle is indicated when the vibration is located in one or more of the left matrix location of the mid row and the left matrix location of the rear row; and the possible collision direction of straight behind the vehicle is indicated when the vibration is located in:

one or more of the left matrix location of the mid row and the left matrix location of the rear row; and one or more of the right matrix location of the mid row and the right matrix location of the rear row.

10. The method of claim 1 wherein:

the possible collision direction of straight ahead of the vehicle or straight behind the vehicle is indicated when the vibration is located in one or more of:

the right and left matrix locations of the front row;

the right and left matrix locations of the mid row; and the right and left matrix locations of the rear row;

the possible collision direction of forward right side, right side or rear right side of the vehicle is indicated when the vibration is located in one or more of the right matrix location of the front row, the right matrix location of the mid row and the right matrix location of the rear row; and the possible collision direction of forward left side, left side or rear left side of the vehicle is indicated when the vibration is located in one or more of the left matrix location of the front row, the left matrix location of the mid row and the left matrix location of the rear row.

11. A system of collision avoidance comprising:

a controller in communication with one or more haptic warning systems, wherein the haptic warning systems are located on a vehicle and the controller includes instructions to implement a method including:

receiving a signal indicative of a potential collision of a vehicle in a given directional location; and generating a haptic collision alert corresponding to the given directional location in response to the signal, wherein the haptic collision alert includes vibrating a seat pan of a vehicle driver seat in the vehicle and the haptic collision alert indicates the urgency of the potential collision by varying one or more of a rate and an intensity of the vibration;

wherein the seat pan is partitioned into a three by three matrix having a front row positioned near the front of the driver seat, a rear row positioned near the rear of the driver seat and a mid row positioned between the front row and the rear row, each row having a left matrix location positioned near the left side of the driver seat, a right matrix location positioned near the right side of the driver seat and a center matrix location positioned between the left matrix location and the right matrix location; and the location of the vibration in the seat pan includes one or more of the matrix locations;

whereby a vehicle driver receives an indication of the possible collision direction by the location of the vibration in the seat pan.

12. The system of claim 11 wherein the signal is responsive to one or more collision avoidance systems each monitoring a directional location around the vehicle.

13. The system of claim 12 wherein the collision avoidance systems include one or more of a forward collision warning system, a lane departure warning system, a forward park assist system and a rear park assist system.

14. The system of claim 12 wherein the collision avoidance systems include one or more of a forward collision warning system, a lane departure warning system, a forward park assist system, a rear park assist system, a backing warning system, a lane change alert system, and a blind spot system.

15. The system of claim 11 wherein the signal is responsive to two or more collision avoidance systems, and the collision avoidance systems monitor two or more directional locations around the vehicle.

16. A storage medium encoded with machine readable computer program code for collision avoidance, the storage medium including instructions for causing a computer to implement a method comprising:

receiving a signal indicative of a potential collision of a vehicle in a given directional location; and generating a haptic collision alert corresponding to the given directional location in response to the signal, wherein the haptic collision alert includes vibrating a seat pan of a vehicle driver seat in the vehicle and the haptic collision alert indicates the urgency of the potential collision by varying one or more of a rate of vibration and an intensity of vibration;

wherein the seat pan is partitioned into a three by three matrix having a front row positioned near the front of the driver seat, a rear row positioned near the rear of the driver seat and a mid row positioned between the front row and the rear row, each row having a left matrix location positioned near the left side of the driver seat, a right matrix location positioned near the right side of the driver seat and a center matrix location positioned between the left matrix location and the right matrix location; and the location of the vibration in the seat pan includes one or more of the matrix locations;

whereby a vehicle driver receives an indication of the possible collision direction by the location of the vibration in the seat pan.

17. A method of collision avoidance comprising:

receiving a signal indicative of a potential collision of a vehicle in a given directional location; and generating a haptic collision alert corresponding to the given directional location in response to the signal, wherein the haptic collision alert includes vibrating a seat pan of a vehicle driver seat in the vehicle and the haptic collision alert indicates the urgency of the potential collision by varying one or more of a rate of vibration and an intensity of vibration;

wherein the seat pan is partitioned into a three by three matrix having a front row positioned near the front of the driver seat, a rear row positioned near the rear of the driver seat and a mid row positioned between the front row and the rear row, each row having a left matrix location positioned near the left side of the driver seat, a right matrix location positioned near the right side of the driver seat and a center matrix location positioned between the left matrix location and the right matrix location; and the location of the vibration in the seat pan includes one or more of the matrix locations; whereby a vehicle driver receives an indication of the possible collision direction by the location of the vibration in the seat pan.

18. The method of claim 17 wherein:

the possible collision direction of straight ahead of the vehicle is indicated when the vibration is located in both the right and left matrix locations of the front row;

the possible collision direction of forward right side of the vehicle is indicated when the vibration is located in the right matrix location of the front row;

the possible collision direction of forward left side of the vehicle is indicated when the vibration is located in the left matrix location of the front row;

the possible collision direction of left side of the vehicle is indicated when the vibration is located in the left matrix location of the mid row;

the possible collision direction of right side of the vehicle is indicated when the vibration is located in the right matrix location of the mid row;

the possible collision direction of straight behind the vehicle is indicated when the vibration is located in the center matrix location of the rear row;

the possible collision direction of rear left side of the vehicle is indicated when the vibration is located in the left matrix location of the rear row; and the possible collision direction of rear right side of the vehicle is indicated when the vibration is located in the right matrix location of the rear row.

19. The method of claim 17 wherein:

the possible collision direction of straight ahead of the vehicle is indicated when the vibration is located in:

the right and left matrix locations of the front row;

the right, center, and left matrix locations of the front row; or the center matrix location of the front row;

the possible collision direction of forward left side, left side or rear left side of the vehicle is indicated when the vibration is located in one or more of the left matrix location of the front row, the left matrix location of the mid row and the left matrix location of the rear row;

the possible collision direction of forward right side, right side or rear right side of the vehicle is indicated when the vibration is located in one or more of the right matrix location of the front row, the right matrix location of the mid row and the right matrix location of the rear row; and the possible collision direction of straight behind the vehicle is indicated when the vibration is located in:

the right and left matrix locations of the rear row;

the right, center, and left matrix locations of the rear row; or the center matrix location of the rear row.

20. The method of claim 17 wherein:

the possible collision direction of straight ahead of the vehicle is indicated when the vibration is located in both the right and left matrix locations of the front row;

the possible collision direction of forward right side, right side or rear right side of the vehicle is indicated when the vibration is located in one or more of the right matrix location of the mid row and the right matrix location of the rear row;

the possible collision direction of forward left side, left side or rear left side of the vehicle is indicated when the vibration is located in one or more of the left matrix location of the mid row and the left matrix location of the rear row; and the possible collision direction of straight behind the vehicle is indicated when the vibration is located in:

one or more of the left matrix location of the mid row and the left matrix location of the rear row; and one or more of the right matrix location of the mid row and the right matrix location of the rear row.

21. The method of claim 17 wherein:

the possible collision direction of straight ahead of the vehicle or straight behind the vehicle is indicated when the vibration is located in one or more of:

the right and left matrix locations of the front row;

the right and left matrix locations of the mid row; and the right and left matrix locations of the rear row;

the possible collision direction of forward right side, right side or rear right side of the vehicle is indicated when the vibration is located in one or more of the right matrix location of the front row, the right matrix location of the mid row and the right matrix location of the rear row; and the possible collision direction of forward left side, left side or rear left side of the vehicle is indicated when the vibration is located in one or more of the left matrix location of the front row, the left matrix location of the mid row and the left matrix location of the rear row.

* * * * *